(12) United States Patent
Heim

(10) Patent No.: US 8,636,418 B2
(45) Date of Patent: Jan. 28, 2014

(54) WHEEL BEARING ARRANGEMENT WITH SENSOR STOP

(75) Inventor: Jens Heim, Bergrheinfeld (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 13/636,398

(22) PCT Filed: Feb. 10, 2011

(86) PCT No.: PCT/EP2011/051950
§ 371 (c)(1),
(2), (4) Date: Sep. 21, 2012

(87) PCT Pub. No.: WO2011/120732
PCT Pub. Date: Oct. 6, 2011

(65) Prior Publication Data
US 2013/0011088 A1    Jan. 10, 2013

(30) Foreign Application Priority Data
Mar. 29, 2010 (DE) .......................... 10 2010 013 214

(51) Int. Cl.
*F16C 32/00* (2006.01)
(52) U.S. Cl.
USPC .......................................... 384/448; 384/589
(58) Field of Classification Search
USPC .......................................... 384/448, 544, 589
See application file for complete search history.

(56) References Cited

U.S. PATENT DOCUMENTS

| 5,640,087 | A | 6/1997 | Alff |
| 5,873,658 | A * | 2/1999 | Message et al. ............... 384/448 |
| 6,231,241 | B1 | 5/2001 | Ohkuma |
| 6,457,869 | B1 | 10/2002 | Smith et al. |
| 7,108,427 | B2 * | 9/2006 | Joki et al. ....................... 384/448 |
| 7,429,133 | B2 * | 9/2008 | Gallion et al. ................. 384/448 |
| 2004/0197039 | A1 * | 10/2004 | Sakamoto et al. ............ 384/448 |
| 2007/0014498 | A1 * | 1/2007 | Aoki et al. ..................... 384/448 |
| 2007/0041673 | A1 * | 2/2007 | Maeda ........................... 384/448 |
| 2007/0053623 | A1 * | 3/2007 | Maeda ........................... 384/448 |
| 2007/0278851 | A1 * | 12/2007 | Nakamura et al. .......... 301/105.1 |
| 2008/0031556 | A1 * | 2/2008 | Heim et al. .................... 384/448 |

FOREIGN PATENT DOCUMENTS

| DE | 69406834 | 4/1998 |
| EP | 0822413 | 2/1998 |

* cited by examiner

*Primary Examiner* — Thomas R Hannon
(74) *Attorney, Agent, or Firm* — Volpe and Koenig, P.C.

(57) ABSTRACT

A wheel bearing arrangement, especially for utility vehicles, having a rotating outer ring (5, 6), a stationary inner ring (3, 2) and rolling elements rolling between these rings, the inner ring being fixed on a stationary axle journal (4) and the outer ring inside a wheel hub (1) having a signal transmitter (9). In order to make it easier to fit a sensor arrangement to the wheel bearing arrangement and to increase driving safety, a sensor (13) interacting with the signal transmitter is arranged so as to axially abut on the inner ring and is then fastened to the spindle by a fastening element (12, 16), thereby allowing, once the bearing rings are mounted, the sensor to be positioned on the inner ring via a stop surface formed onto the sensor and then to be permanently immobilized by a screw or other fastening element.

7 Claims, 2 Drawing Sheets

WHEEL BEARING ARRANGEMENT WITH SENSOR STOP

FIELD OF THE INVENTION

The invention relates to a wheel bearing arrangement, especially for utility vehicles, comprising a rotating outer ring, a stationary inner ring, and rolling elements rolling between said rings, the inner ring being fixed on a stationary axle journal and the outer ring being fixed inside a wheel hub having a signal transmitter.

BACKGROUND

Wheel bearings with rotating outer rings must include precautions with respect to driving safety in order to protect the driver and other people involved in traffic, because these bearings are often used in utility vehicles with large weights and consequently involve a high risk of danger.

Rotational speed sensors that are used to detect the rotational speed of the wheel contribute to safety because advantageously they can be operated with anti-lock braking systems. However, there is the problem of reliable attachment and exact positioning. A rotational speed sensor is currently screwed to the axle journal and then the wheel hub with the signal transmitter is installed. The axial position of the sensor on the axle journal and the position of the outer ring define the detection distance between the sensor and the signal transmitter. This makes the installation much more difficult, because high precision must be ensured when pressing in the wheel bearing and it may not be possible to change the position of the sensor at a later time.

From DE 694 06 834 T4, a sensor arrangement for a wheel bearing with a rotating outer ring is known, wherein the rotational speed sensor can be positioned and fixed in the radial direction by a snap-on mechanism on a cold-formed sheet-metal part. Such a complicated positioning and fastening device requires high manufacturing costs and is susceptible to disadvantageous displacement of the sensor during operation. The number of components in the sensor arrangement is also disadvantageously high.

SUMMARY

Therefore, the objective of the invention is to simplify the installation of a wheel bearing arrangement with a sensor arrangement and to increase the positioning accuracy of the sensor. Another objective is to compensate for the disadvantages named above.

These objectives are achieved by a wheel bearing unit of the type named above, such that a sensor interacting with the signal transmitter is arranged axially abutting the inner ring and is fastened on the axle journal with a fastening mechanism.

The wheel bearing arrangement is provided with a rotating outer ring, a stationary inner ring, and rolling elements rolling between the rings. The outer ring is a bearing ring that forms an inner race of the rolling elements, exactly like the inner ring forms an outer race for the rolling elements. Thus, the load is transmitted during the wheel bearing operation from the outer ring to the rolling elements and from these elements to the inner ring.

Here, the inner ring is fixed on a stationary axle journal and the outer ring is fixed inside a wheel hub having a signal transmitter. The wheel hub comprises the wheel bearing or even forms the outer ring. The axle journal can have a multiple-part construction, wherein the inner ring is fastened to this journal, especially pressed or molded on.

The signal transmitter is an annular part of the sensor arrangement and can be constructed as a so-called encoder. Here, an encoder made from a corrugated sheet or a punched sheet can be used. Alternatively, a multi-pole encoder could be used that has alternating magnetic north and south poles.

According to the invention, a sensor interacting with the signal transmitter is arranged axially abutting the inner ring and is fastened on the axle journal with a fastening mechanism or several fastening mechanisms. The inner ring is accessible in its operating position such that the sensor, for example, a rotational speed sensor, can be pushed until axially abutting the inner ring. In this position fixed by the stop, the sensor can also be attached to the axle journal or to a component of this journal. An axial stop surface of the inner ring and an axial stop surface of the sensor are in this way guided together and contact each other. The stop of both surfaces can be comprised by the signal transmitter and/or the outer ring.

Advantageously, a part of the sensor projecting in the axial direction has an axial stop surface. This projecting part extends in the axial direction relative to the rest of the sensor, in particular, relative to the detecting part of the sensor. For example, the projecting part has a partially annular shape in the peripheral direction. In this way, the sensor is guided in the axial direction by the essentially cylindrical outer surface of the axle journal and is stabilized in the radial directions.

In one advantageous embodiment, the axially projecting part is comprised partially or completely by the signal transmitter. In this way, the signal transmitter can still be installed together with the wheel bearing on the axle journal. The stop can be established without a direct view of the stop surfaces.

Advantageously, the outer ring is constructed integrally with the wheel hub and has one or two inner races for rolling elements. Therefore, the number of components is advantageously reduced. Optionally, an outer ring constructed separate from the wheel hub can have two roller element races and/or can be produced from a higher quality material. The simplest option includes two separate outer rings each with one inner race.

As the fastening element for the sensor, a screw or an elongated hole or both could be used. The elongated hole on the sensor allows access to an internal thread in the axle journal or a component of this journal, wherein the sensor can be fixed and attached in different positions. The elongated hole can here be formed in a part of the sensor on the outside in the radial direction relative to the rotational axis of the wheel bearing, with this part also being accessible when the wheel bearing unit is installed. Alternatively, other known fastening elements could also be used that achieve a similar effect as a screw. For example, a bolt could be used for the fastening in connection with the elongated hole. Alternatively, the sensor could be welded, bonded, or clamped in place.

In one advantageous embodiment, the axial stop surface of the sensor contacts the inner ring with a pretensioning force. The pretensioning force can be caused by a spring element that is arranged between an axial surface of the axle journal and an axial surface of the sensor. The pretensioning leads to a contact of the inner ring and the sensor that is also not broken when the fastening element is actuated. The axial pretensioning thus can be maintained in the fastened and unfastened states. This guarantees that the position of the sensor is not disadvantageously changed by too great a torsion effect during the screwing process.

Additional advantageous constructions and preferred improvements of the invention are found in the description of the figures and/or in the dependent claims.

BRIEF DESCRIPTION OF THE DRAWINGS

The invention is described and explained below in more detail with reference to the embodiments shown in the figures.

Shown are.

DETAILED DESCRIPTION OF THE PREFERRED EMBODIMENTS

Figure 1:
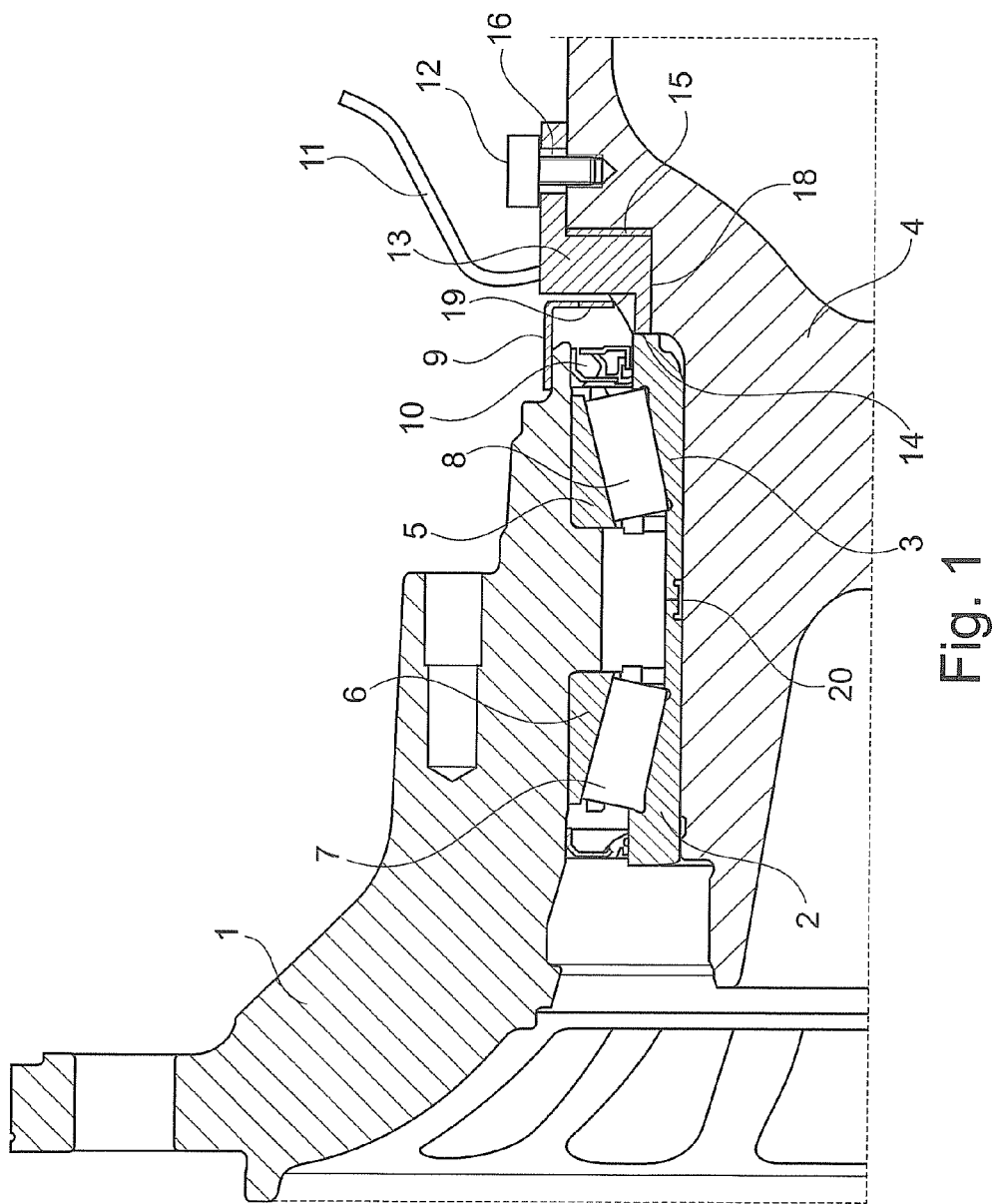
FIG. 1 a wheel bearing arrangement in a longitudinal section to its rotational axis with a sensor stop on the inner ring, and FIG. 2 a wheel bearing arrangement in a longitudinal section to its rotational axis with a pretensioned sensor stop on the inner ring.

FIG. 1 shows a wheel bearing arrangement in a longitudinal section to its rotational axis with a sensor 13 stopped on the inner ring 3.

The wheel bearing shown in the longitudinal section has a wheel hub 1 with a molded wheel flange and two pressed-in, outer rings 5, 6 of the two-row tapered roller bearing. The path of the pretensioning force of the bearing rings is from the wheel hub 1 via the two outer rings 5, 6, the rolling elements 7, 8, and the two inner rings 2, 3, wherein the two inner rings 2, 3 are held together axially by means of a securing ring 20.

On the gear-side end of the wheel hub 1 there is a signal transmitter 9 that is constructed as a multi-pole encoder with a signal-transmitting region 19 in its disk-shaped part with alternating north and south poles. The movements of the multi-pole encoder 9 are detected in the sensor 13 that is fixed on the axle journal 4 with the screw.

The sensor 13 has an S-shape and is arranged axially between the axle journal 4 and the multi-pole encoder 9 with axial play. This axial play exists only when the fastening screw 12 is not tightened. The screw 12 can fixedly be screwed in the axle journal 4, but the sensor 14 can move axially up to a stop with the inner ring 3 when the screw 12 is not tightened. This is also made possible by the clearance 15 to the axle journal and by the elongated hole 16, wherein the elongated hole 16 is oriented in the axial direction. The stop is realized with the axial stop surface 14 of the axially projecting part 18 of the sensor 13. As soon as the sensor 13 is positioned in this way, it can be finally fastened with the screw 12 or a similar fastening mechanism.

Thanks to the clearance 15, it is possible for the signal transmitter 9 to reach up to the sensor 13 by pushing inward in the axial direction during the installation of the wheel hub 1 and optionally for this to move in the axial direction. Because the sensor 13 is not yet fixed at this time, the signal transmitter 9 is not damaged. As soon as the signal transmitter 9 and the wheel hub 1 are installed, the positioning and fastening of the sensor 13 can take place in the described way.

The cable 11 is advantageously not in the way during installation, but it can also be fastened with a cable tie. Alternatively or optionally, a cable clip with a bolt could be used. The bolt fixes the cable clip on a stationary part, e.g., a wheel support, and the cable clip allows the cable to be clamped by a screw-assisted shortening of the metal strip surrounding the cable. Another possibility consists in using a cable sleeve that surrounds the cable and clamps it in a plate holder.

Figure 2:
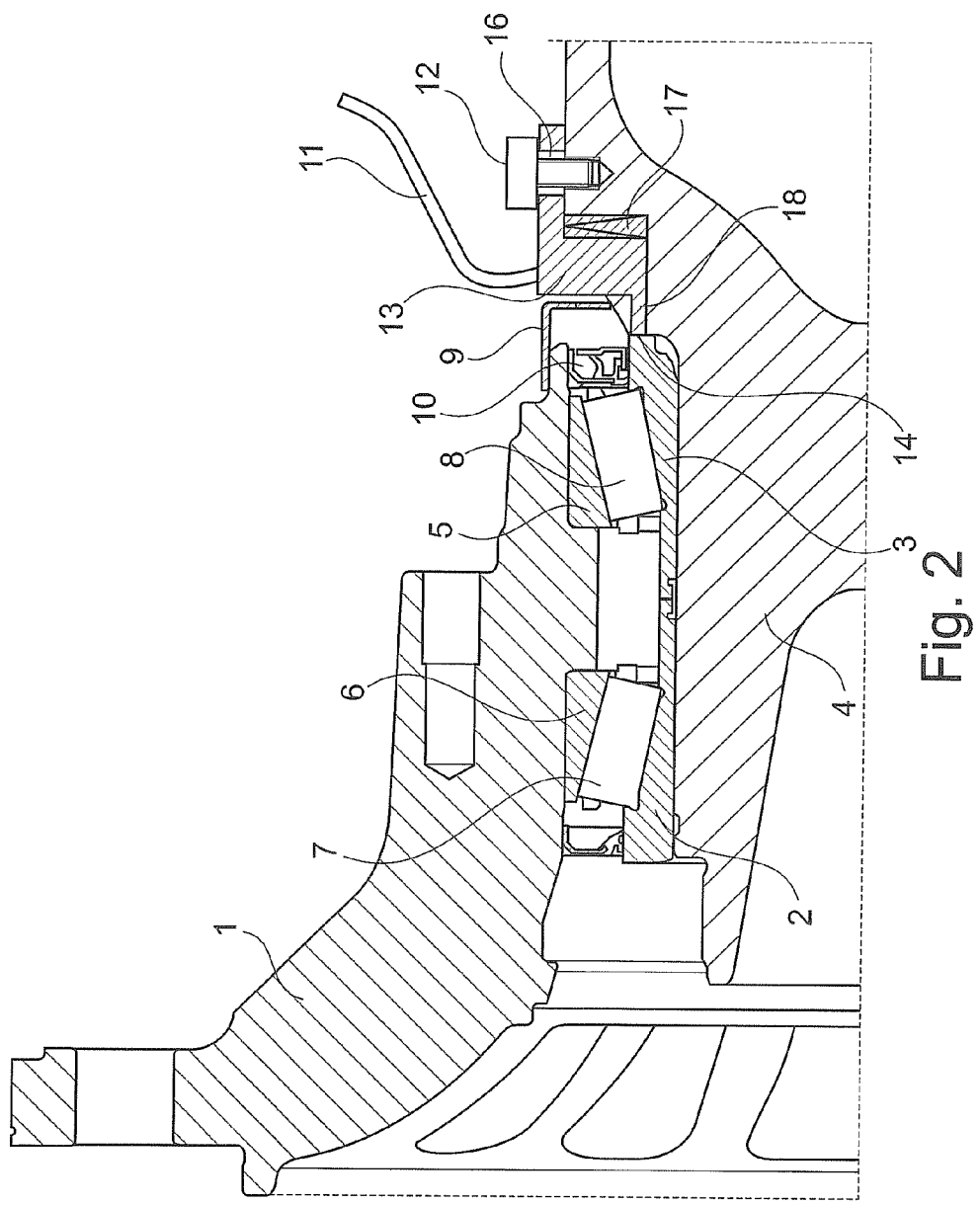

FIG. 2 shows a wheel bearing arrangement in a longitudinal section relative to its rotational axis with a pretensioned sensor 13 stopping on the inner ring 3.

In comparison to the wheel bearing from FIG. 1, the sensor 13 is pretensioned relative to the axle journal 4. Advantageously, the pretensioning element 17 is guided axially by the sensor 13 and covered radially and thus protected. If necessary, additional measures can be used for holding the pretensioning element 17. The pretensioning element 17 can be formed as a steel spring or from an elastic material.

The pretensioning is thus realized in the axial direction, wherein the stop surface 14 is provided for transmitting the pretensioning force to the inner ring 3. Because the pretensioning element is arranged on the radial inside relative to the signal transmitter 9 and the rest of the sensor 13, the sealing arrangement 10 can be advantageously protected by the signal transmitter 9 in the radial and axial directions. It is further advantageous that the sensor 13 and the signal transmitter 9 form a sealing gap in the radial direction.

It is also noted that the statements and reference symbols for FIG. 1 should be used for reference.

In summary, the invention relates to a wheel bearing arrangement, especially for utility vehicles, comprising a rotating outer ring, a stationary inner ring, and rolling elements rolling between said rings, the inner ring being fixed on a stationary axle journal and the outer ring being fixed inside a wheel hub having a signal transmitter. The aim of the invention is to make it easier to install a sensor arrangement on the wheel bearing arrangement and to increase the driving safety. To achieve this aim, a sensor interacting with the signal transmitter is arranged so as to axially abut on the inner ring and is then fastened to the axle journal by a fastening element. This method allows, once the bearing rings are mounted, the sensor to be positioned on the inner ring by means of a stop surface formed on this sensor and then to be permanently immobilized by means of a screw or any other fastening element.

List of Reference Symbols
1 Wheel hub
2 Inner ring
3 Inner ring
4 Axle journal
5 Outer ring
6 Outer ring
7 Tapered roller
8 Tapered roller
9 Signal transmitter
10 Sealing arrangement
11 Cable
12 Screw
13 Sensor
14 Axial stop surface
15 Clearance
16 Elongated hole
17 Pretensioning element
18 Axially projecting part
19 Signal-transmitting region
20 Securing ring

The invention claimed is:

1. Wheel bearing arrangement comprising: a rotating outer ring, a stationary inner ring, and rolling elements rolling between the rings, with the inner ring being fixed on a stationary axle journal and the outer ring being fixed inside a wheel hub having a signal transmitter, a sensor interacting with the signal transmitter is arranged axially abutting the inner ring and is fixed with a fastening element on the axle journal, the fastening element includes a screw and an elongated hole extending in the axial direction to allow a position of the sensor to be axially adjusted with respect to the inner ring.

2. Wheel bearing arrangement according to claim 1, wherein the sensor includes a part projecting in an axial direction that has an axial stop surface.

3. Wheel bearing arrangement according to claim 2, wherein the axial stop surface of the sensor contacts the inner ring with a pretensioning force.

4. Wheel bearing arrangement according to claim 2, wherein the axially projecting part is enclosed at least partially by the signal transmitter.

5. Wheel bearing arrangement according to claim 1, wherein the outer ring is constructed integrally with the wheel hub.

6. Wheel bearing arrangement comprising: a rotating outer ring, a stationary inner ring, and rolling elements rolling between the rings, with the inner ring being fixed on a stationary axle journal and the outer ring being fixed inside a wheel hub having a signal transmitter, a sensor interacting with the signal transmitter is arranged axially abutting the inner ring and is fixed with a fastening element on the axle journal, the sensor including a part projecting in an axial direction that has a first axial stop surface for abutting against a second axial stop surface of the inner ring, and a spring element is arranged between an axial surface of the axle journal and an axial surface of the sensor opposite the first axial stop surface, the spring element provides a pretensioning force that biases the first axial stop surface of the sensor against the second axial stop surface of the inner ring.

7. Wheel bearing arrangement according to claim 6, wherein the spring element is formed of steel spring or an elastic material.

* * * * *